United States Patent
De'Longhi et al.

(10) Patent No.: US 11,045,038 B2
(45) Date of Patent: Jun. 29, 2021

(54) COFFEE MACHINE WITH A SYSTEM FOR A SINGLE DOSE DISPENSING OF EMULSIONATED AND HEATED MILK

(71) Applicant: De'Longhi Appliances S.R.L., Treviso (IT)

(72) Inventors: Giuseppe De'Longhi, Treviso (IT); Antonio Panciera, Carbonera (IT); Andrea Zottarel, San Dona di Piave (IT)

(73) Assignee: De'Longhi Appliances S.R.L., Treviso (IT)

( * ) Notice: Subject to any disclaimer, the term of this patent is extended or adjusted under 35 U.S.C. 154(b) by 303 days.

(21) Appl. No.: 16/301,490

(22) PCT Filed: May 17, 2017

(86) PCT No.: PCT/EP2017/061795
§ 371 (c)(1),
(2) Date: Nov. 14, 2018

(87) PCT Pub. No.: WO2017/198688
PCT Pub. Date: Nov. 23, 2017

(65) Prior Publication Data
US 2019/0183283 A1 Jun. 20, 2019

(30) Foreign Application Priority Data
May 17, 2016 (IT) .................. 102016000050750

(51) Int. Cl.
*A47J 31/40* (2006.01)
*A47J 31/44* (2006.01)

(52) U.S. Cl.
CPC ....... *A47J 31/4485* (2013.01); *A47J 31/4457* (2013.01); *A47J 31/4496* (2013.01); *A47J 31/402* (2013.01)

(58) Field of Classification Search
CPC ...... A47J 31/402; A47J 31/40; A47J 31/4485; A47J 31/4489; A47J 31/4496; A47J 31/4457
(Continued)

(56) References Cited

U.S. PATENT DOCUMENTS

| | | | |
|---|---|---|---|
| 2007/0243305 A1 | 10/2007 | Marconi | |
| 2012/0137894 A1* | 6/2012 | Goeltenboth | A47J 31/44 99/285 |
| 2015/0027324 A1 | 1/2015 | Reyhanloo | |

FOREIGN PATENT DOCUMENTS

| | | | | |
|---|---|---|---|---|
| EP | 2386229 A1 * | 11/2011 | .......... | A47J 31/4485 |
| EP | 2594172 A1 | 5/2013 | | |

OTHER PUBLICATIONS

International Search Report dated Sep. 1, 2017; International Application No. PCT/EP2017/061795; International Filing Date: May 17, 20117; 4 pages.
(Continued)

Primary Examiner — Reginald Alexander
(74) Attorney, Agent, or Firm — Blank Rome LLP (57) ABSTRACT

The coffee machine (1) with a system for emulsifying and heating milk comprises a body (2) having a coffee dispenser (3) and a device (4) for emulsifying and/or heating milk having a carafe (6) for containing the milk and a lid (7) for closing the carafe (6), means (8) for conveying the steam generated inside the coffee machine, to a Venturi tube (9) present in the lid (7) so as to emulsify and/or heat the milk inside said lid, the device (4) being provided with detection means (12) for detecting the presence of milk in the carafe (6) so as to interrupt the dispensing of milk when said carafe (6) is completely empty.

12 Claims, 8 Drawing Sheets

(58) Field of Classification Search
USPC .................................... 99/293, 323.1, 285
See application file for complete search history.

(56) References Cited

OTHER PUBLICATIONS

Written Opinion dated Sep. 1, 2017; International Application No. PCT/EP2017/061795; International Filing Date May 17, 2017; 5 pages.
English translation of European Publication No. 2594172; Published May 22, 2013; 18 pages.

* cited by examiner

COFFEE MACHINE WITH A SYSTEM FOR A SINGLE DOSE DISPENSING OF EMULSIONATED AND HEATED MILK

RELATED APPLICATIONS

This application is a U.S. national phase application of International Application No. PCT/EP2017/061795, filed May 17, 2017; which application claims priority to Italy Application No. 102016000050750, filed May 17, 2016. Each of the above-identified related applications are incorporated by reference.

FIELD OF USE

As it is well known, there are currently many types of coffee machines on the market provided with, besides the traditional coffee dispenser, also a device for emulsifying and/or heating the milk.

BACKGROUND OF THE INVENTION

Normally, these devices have a carafe for containing the milk and a lid for closing it and means for conveying the steam, generated inside the coffee machine, to a Venturi tube present in the lid so as to emulsify and/or heat the milk inside said lid.

The carafe is normally supported by the support surface of the machine so that its weight, when it is full, does not rest completely on the closure system provided between the lid and the carafe. Furthermore, the systems for emulsifying and/or heating the milk have a large carafe so that they can contain an amount of milk suitable for making more cappuccinos or more hot or frothed milk drinks.

The foregoing implies that the machine must be prepared to interrupt the dispensing of the milk at the end of each dispensing cycle which is normally timed and therefore dependent on many physical variables deriving from the temperature and the type of water and milk being used.

In addition to the above-mentioned, the known systems for dispensing emulsified and/or heated milk have the drawback of emitting annoying and damaging if not even dangerous jets or puffs of residual steam at the end of dispensing.

This drawback is mainly due to the fact that at the end of the timed cycle both the boiler and the coffee machine pump switch off at the same time irrespective of whether there is or not still milk to be emulsified or heated in the carafe.

Further, the positioning and the size of the carafe of the known coffee machines being supported by the support surface of the coffee machine is always in the vicinity of the cup and therefore subject to be easily dirtied and so may be any temperature or carafe presence sensors.

Last but not least the presence of the carafe on the support surface of known coffee machines takes completely the space away and the possibility to be able to dispense on two different cups on one side coffee with or without milk and on the other emulsified or simply heated milk by means of a device placed on the edge of the same machine, bearing in mind the enormous drawbacks of the coffee machines whose suction of milk occurs from containers placed outside the machine and connected to it by means of a tube for transporting milk inside the machine.

SUMMARY OF THE INVENTION

The technical task of the present invention is to eliminate the above-mentioned drawbacks of the prior art.

Within the scope of this technical task, an object of the invention is to design a coffee machine with a system for emulsifying and heating the milk according to the invention which enables to provide with a complete dispensing of milk independent from the amount of the same that has been inserted in the carafe.

Within the scope of this technical task, an object of the invention is to design a coffee machine with a system for emulsifying and heating the milk according to the invention, which enables to simplify the use by the user who no longer has to set the amount of milk and/or the dispensing time of the same from the carafe.

Another object of the invention is to design a coffee machine with a system for emulsifying and heating the milk according to the invention which enables to prevent unwanted jets and puffs of steam that could be dangerous at the end of dispensing milk.

Another object of the invention is to design a coffee machine with a system for emulsifying and heating the milk according to the invention which enables to maintain the connection of the carafe in a hygienically clean area.

Another object of the invention is to design a coffee machine with a system for emulsifying and heating the milk according to the invention which enables to prevent the constraint of the carafe on the support surface of the cups where stains and residues of coffee and milk can often be found which can dirt the support and carafe surface over time.

Another object of the invention is to design a coffee machine with a system for emulsifying and heating the milk according to the invention which enables the positioning of the cup in which milk is also dispensed beneath the carafe enabling a dispensing of the only milk beverage in a second cup concomitantly with the presence of a first cup placed under the coffee dispenser.

Another object of the invention is to design a coffee machine with a system for emulsifying and heating the milk according to the invention which enables to protect the sensors from dirt, always guaranteeing a perfect use.

Another object of the invention is to design a coffee machine with a system for emulsifying and heating the milk according to the invention which enables the ability to read by the same sensors both the presence of milk and the carafe.

This task as well as this and other objects are achieved by a coffee machine with a system for emulsifying and heating the milk, comprising a body having a coffee dispenser and a device for emulsifying and heating the milk having a carafe for containing the milk and a lid for closing the carafe, means for conveying steam, generated inside the coffee machine, and a Venturi tube present in the lid to emulsify and/or heat the milk inside the lid, the device being provided with means for detecting the presence of the milk in the carafe to interrupt the dispensing of milk when said carafe is completely empty.

Advantageously, said device is suitable for itself to a single-dose dispensing of emulsified and heated milk.

Single-dose means complete dispensing in a single solution of the entire amount of milk, also variable from time to time, which the user introduces in the carafe.

Advantageously, said device is also movably associated to said machine in a projecting position with respect to said body so that said carafe remains at a distance from the support surface for at least a first cup for collecting said coffee and/or said emulsified and/or heated milk.

Further characteristics of the coffee machine according to the invention are set forth in the claims subordinated to claim 1.

In particular, the detection means are placed on said machine at a distance from said support surface, in proximity to said bottom to detect the residual amount of milk in said carafe and to interrupt the production of said steam in advance and to use substantially an amount of steam dispensed as to use solely and exclusively the entire amount of milk present in said carafe.

The detection means comprise at least a first emitter sensor and a second receiver sensor for the optical detection of said residual amount of said milk in said carafe.

The detection means also include at least a third sensor so as to detect a first volume level of amount with said first and second sensors and a second volume of said residual amount of said milk in said carafe when the carafe is completely empty.

The lid has a dispenser tube of said emulsified and/or heated milk movable from a position with substantially an axis orthogonal to said support surface of said first cup to a position with an inclined axis intersecting the flow of said coffee which is released from said coffee dispenser, when the dispenser tube is with inclined axis, dispenses said milk in said first cup together with said coffee and when said dispenser tube is substantially with orthogonal axis dispenses said milk only in a second cup.

The carafe is removably constrained to said lid by means of a connecting device that eliminates possible shifting in the position thereof and when said steam is being dispensed, the water pump and the boiler of said coffee machine are activated and said milk is emulsified and/or heated and dispensed by said dispenser tube until said first, second and third sensors detect said residual amount of said milk in said carafe and, thus, deactivate said boiler leaving said pump activated.

During the activation of said pump and the deactivation of said boiler, said coffee machine provides for releasing the residual steam before the dispensing of said milk from said carafe has been completed.

Finally, it should be mentioned that the first, second and third sensors are infrared sensors, that the device is completely outside of said body of said coffee machine and that said carafe has a volume for containing said milk that is substantially equal to a standard dose of milk needed to make one cappuccino.

BRIEF DESCRIPTION OF THE DRAWINGS

Further characteristics and advantages of the invention will become more apparent from the description of a preferred but non-exclusive embodiment of a coffee machine with a system for emulsifying and heating the milk illustrated by way of non-limiting example in the accompanying drawings, in which.

DETAILED DESCRIPTION OF THE ILLUSTRATED EMBODIMENTS

With particular reference to the above figures, the coffee machine with a system for emulsifying and heating the milk is shown as a whole with number 1.

The coffee machine comprises a body 2 having on the same face a coffee dispenser 3 and a device 4 for emulsifying and/or heating the milk 5.

The device 4 has a carafe 6 for containing the milk and a closure lid 7 thereof.

Because of the reasons described below the carafe 6 is in transparent material.

Inside the lid there are means 8 for conveying steam which is generated inside the coffee machine in a traditional way through a water pump and one or more boilers.

The generated steam is sent to a Venturi tube 9 present in the lid so as to emulsify and/or heat said milk inside said lid.

Figure 1:
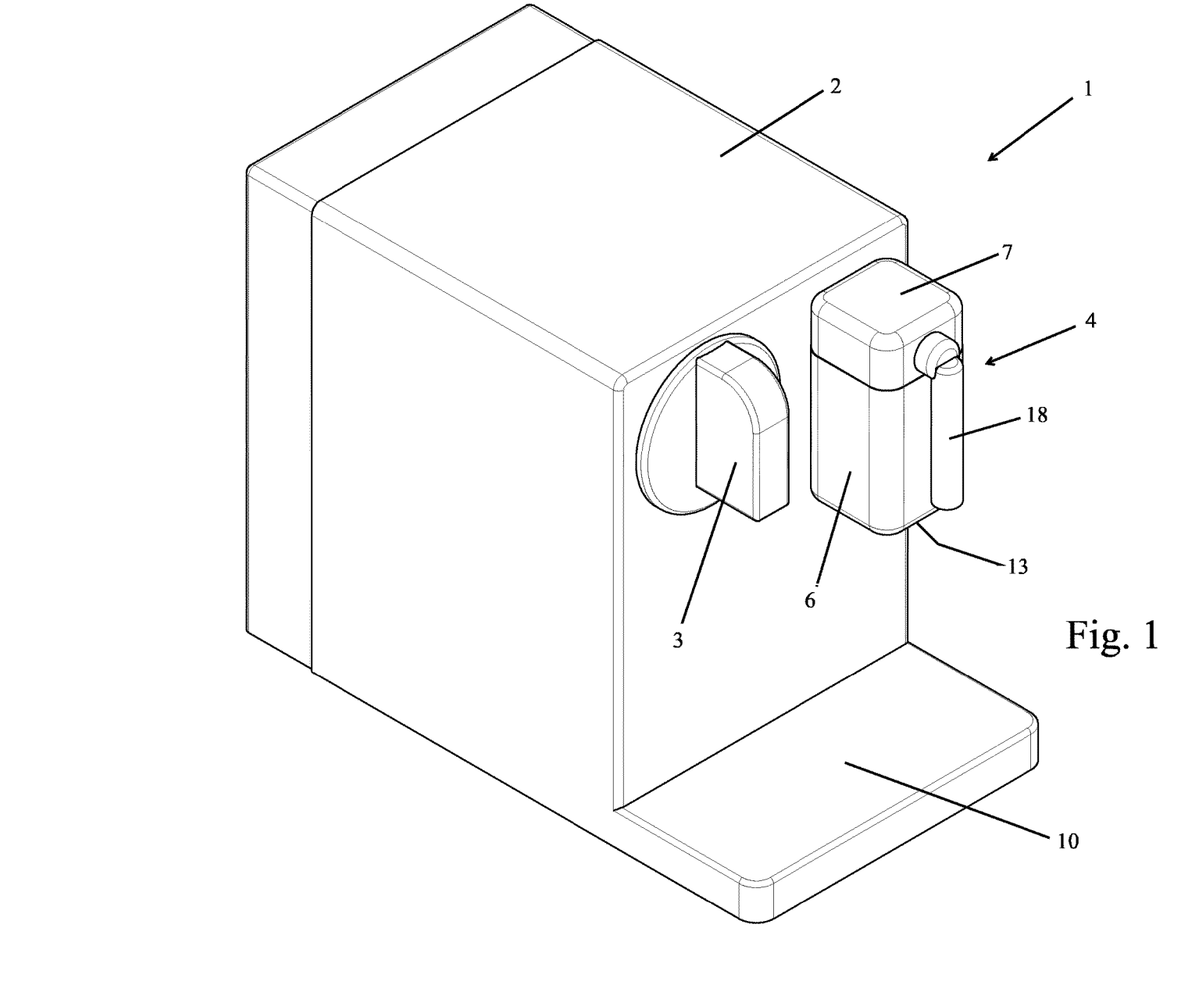
FIG. 1 is a perspective view of the coffee machine with a system for emulsifying and heating the milk according to the invention.
Figure 2:
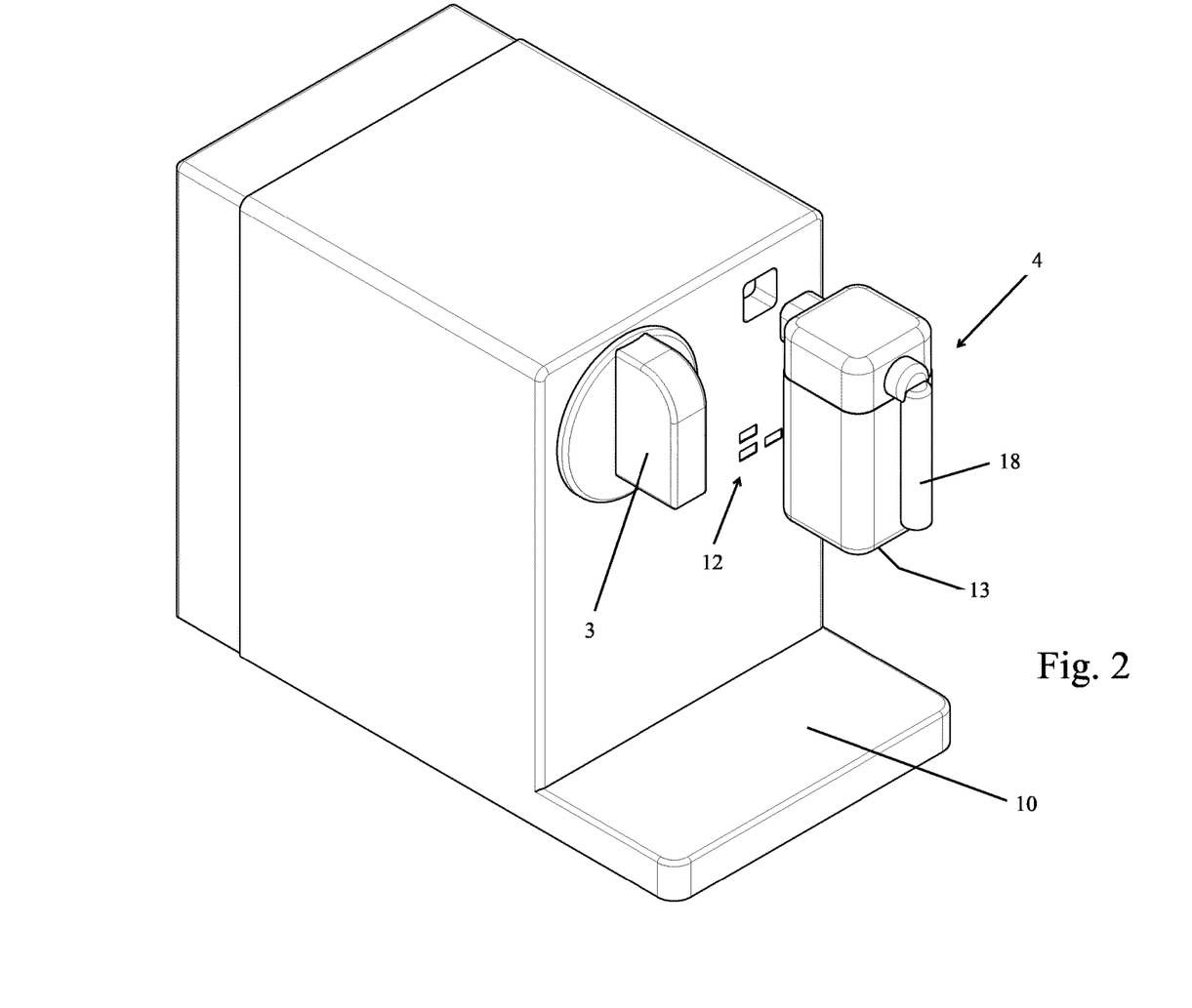
FIG. 2 is a perspective view of the coffee machine with a system for emulsifying and heating the milk according to the invention with the device detached from the body of the machine.

Advantageously, the device 4 is removably associated with the machine 1 in a projecting position with respect to said body 2 so that the carafe 6 remains at a distance from the support surface 10 of the machine on which the cups or other containers are normally placed.

In particular, on the support surface 10, as further described below, it is possible to place at least a first cup 11 for collecting said coffee and/or said emulsified and/or heated milk and a second cup 20 adapted to receive only the emulsified and/or heated milk.

The machine 1 also has detection means, generally indicated by 12, of the presence of milk 14 in the carafe 6 whose primary function is to interrupt the dispensing of steam from the machine 1 to the Venturi tube 9 when the carafe 6 is completely empty.

In particular, the detection means 12 are placed on the body 2 of the machine 1 also at a distance from the support surface 10 so as to be substantially placed in proximity to the bottom 13 of the carafe.

This particular projecting positioning without underlying constraints of the device 4 and therefore of the carafe 6 enables its connection in a hygienically clean area unlike the support with constraint on the cup support surface 10 of the prior art where often stains and/or residues of coffee and/or milk can be found that can dirt the surface of both the support and the carafe surface 6.

The above is also true for the positioning of detection means 12.

Further, the floating positioning of the carafe 6 enables the positioning of the first and second cups 11 and 20 below the device 4 so that they can be filled simultaneously and individually with coffee and milk.

In fact, the lid 7 has a dispenser tube 18 of emulsified and/or heated milk which is movable from a position with an axis substantially orthogonal to the support surface 10 to a position with inclined axis intersecting the flow of the coffee released from the coffee dispenser 3.

Figure 6:
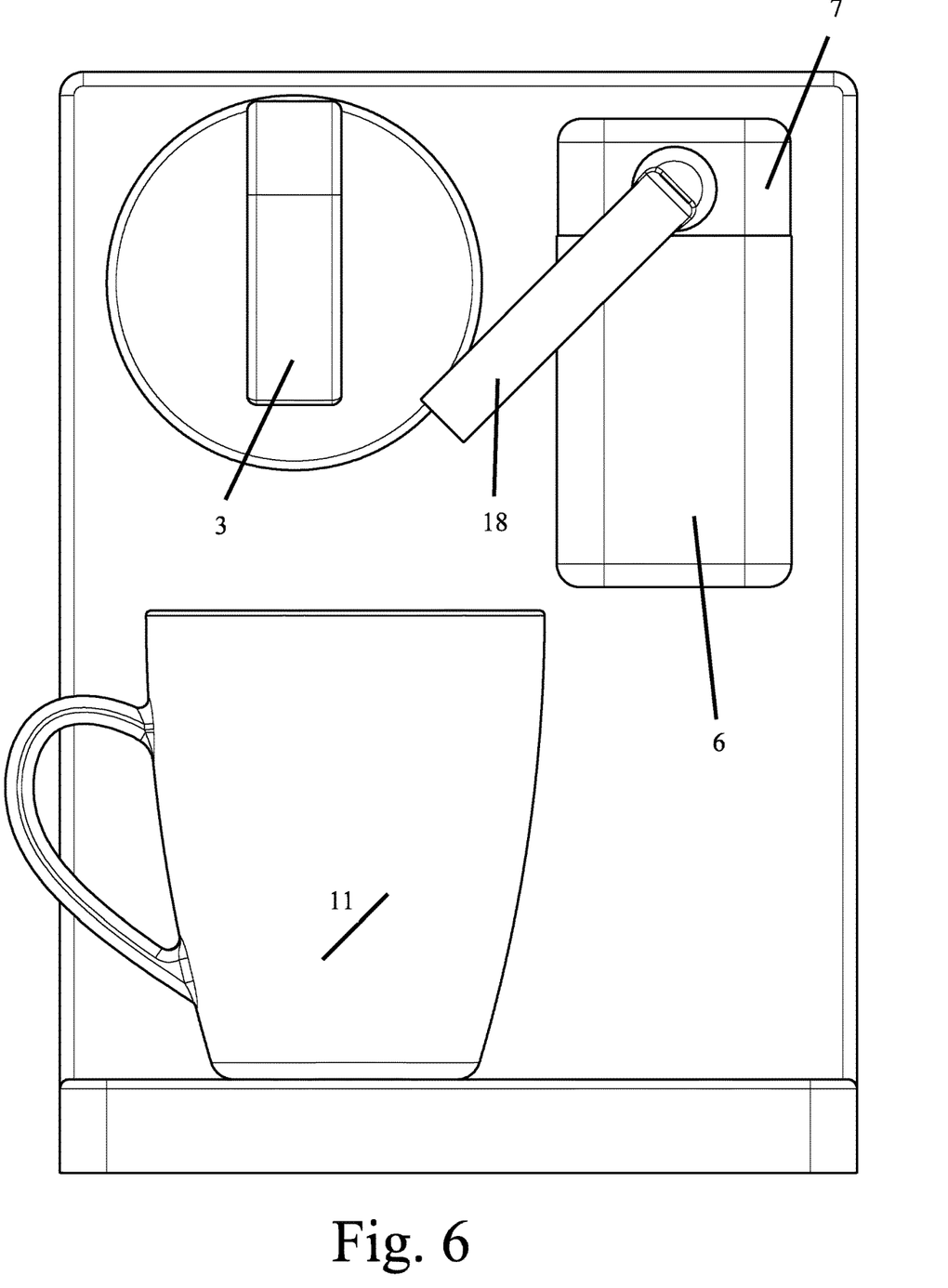
FIG. 6 and FIG. 7 show respectively the possibility of the coffee machine with a system for emulsifying and heating the milk according to the invention to dispense coffee and milk simultaneously in a first and second cup.
Figure 7:
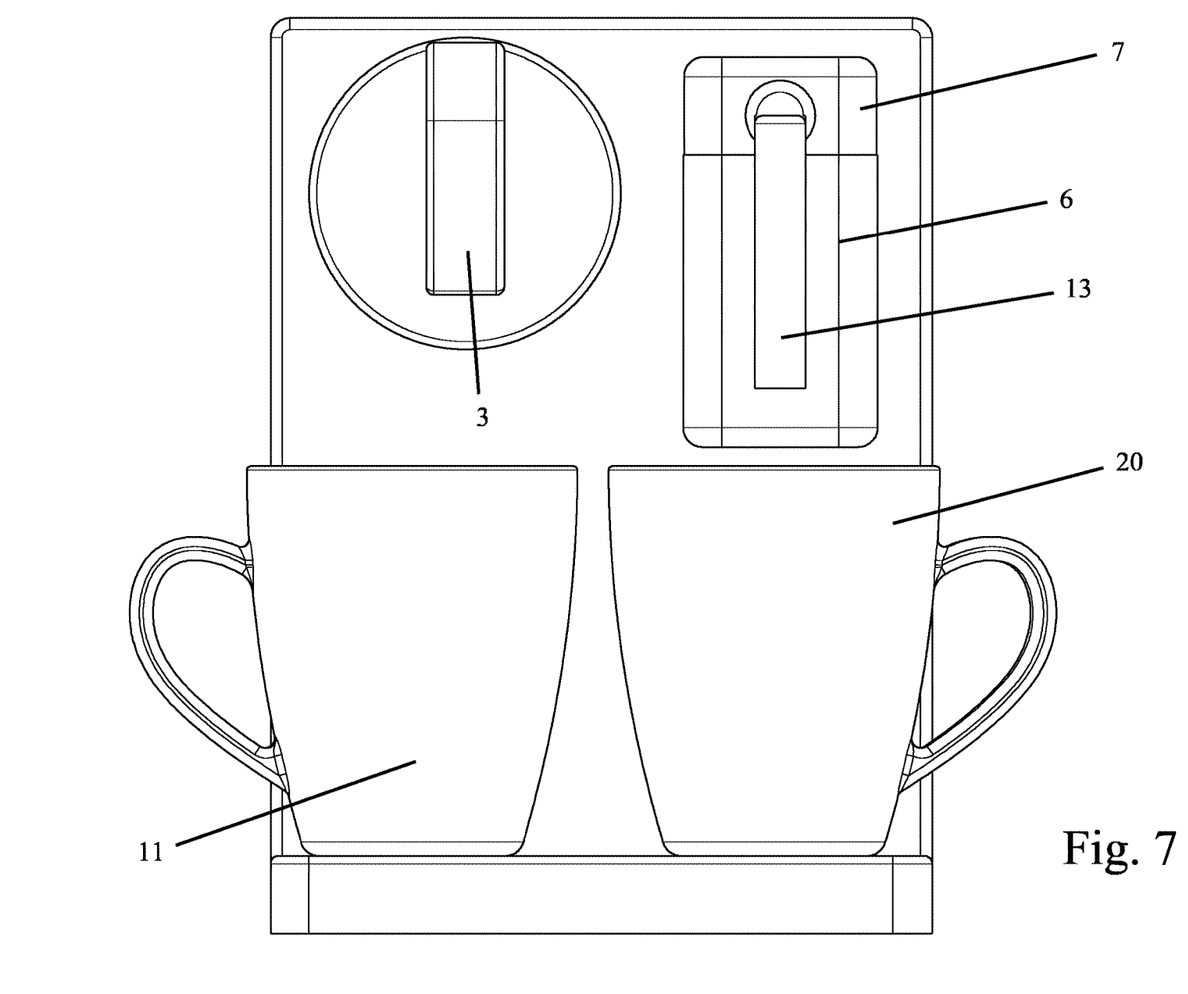

Thanks to the suspension of the carafe and the possibility of rotation of the dispenser tube 18 when the latter is with an inclined axis, dispenses milk in the first cup 11 together with the coffee dispensed by the dispenser 3 and when the dispenser tube is placed with a substantially orthogonal axis, it dispenses only milk in the second cup 20.

In particular, the detection means 12 are placed on said machine in proximity to the bottom 13 of the carafe to accurately detect the residual amount of milk 14 remained in the carafe and to interrupt in advance the production of steam whose advance is proportional to the volume of the amount of residual milk.

In this way, the detection means 12 can only substantially utilize the amount of steam dispensed as to use solely and exclusively the entire amount of milk present in the carafe.

Figure 3:
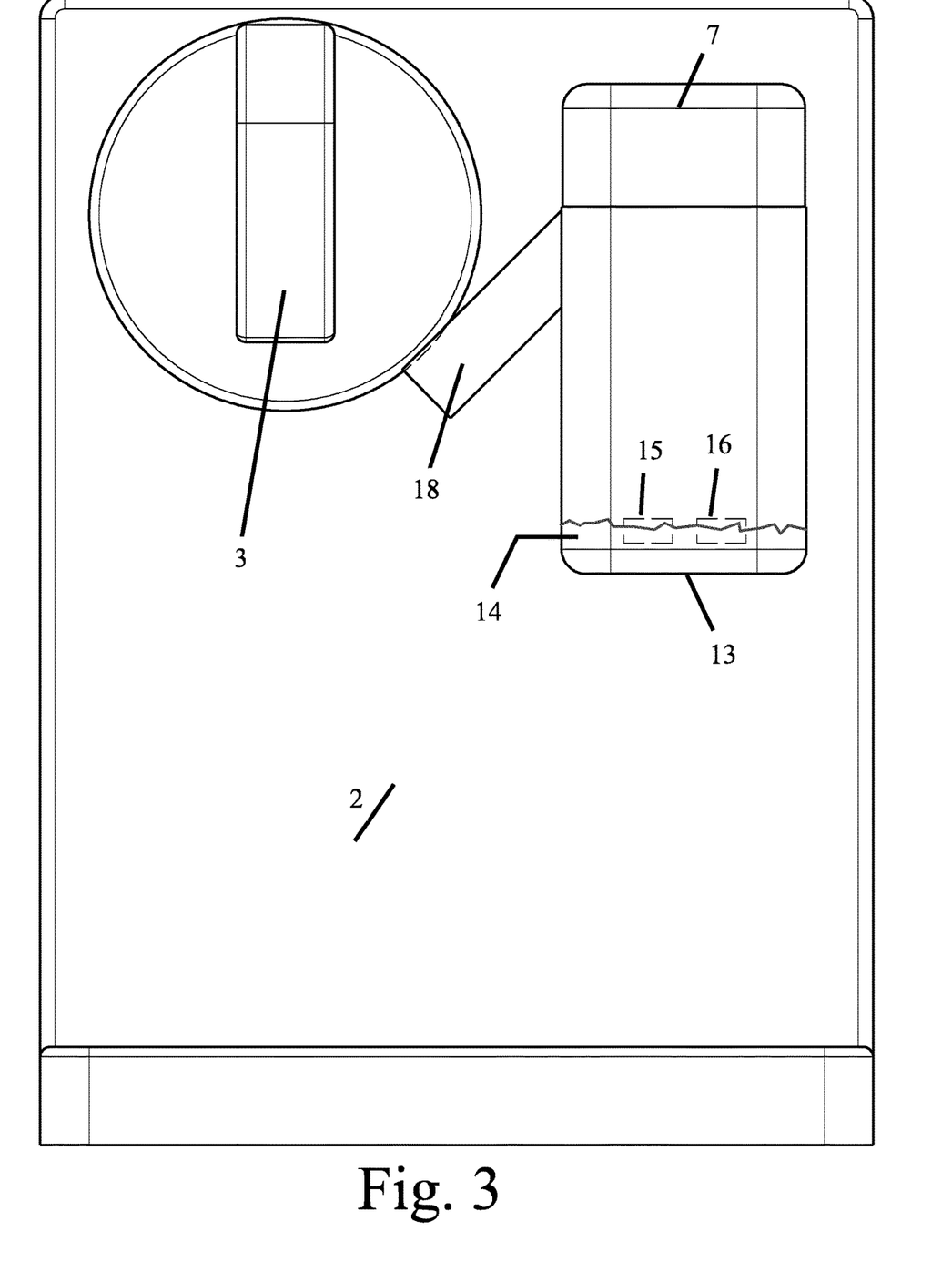
FIG. 3 is a front elevation view of the coffee machine with a system for emulsifying and heating the milk according to the invention with two sensors.
Figure 4:
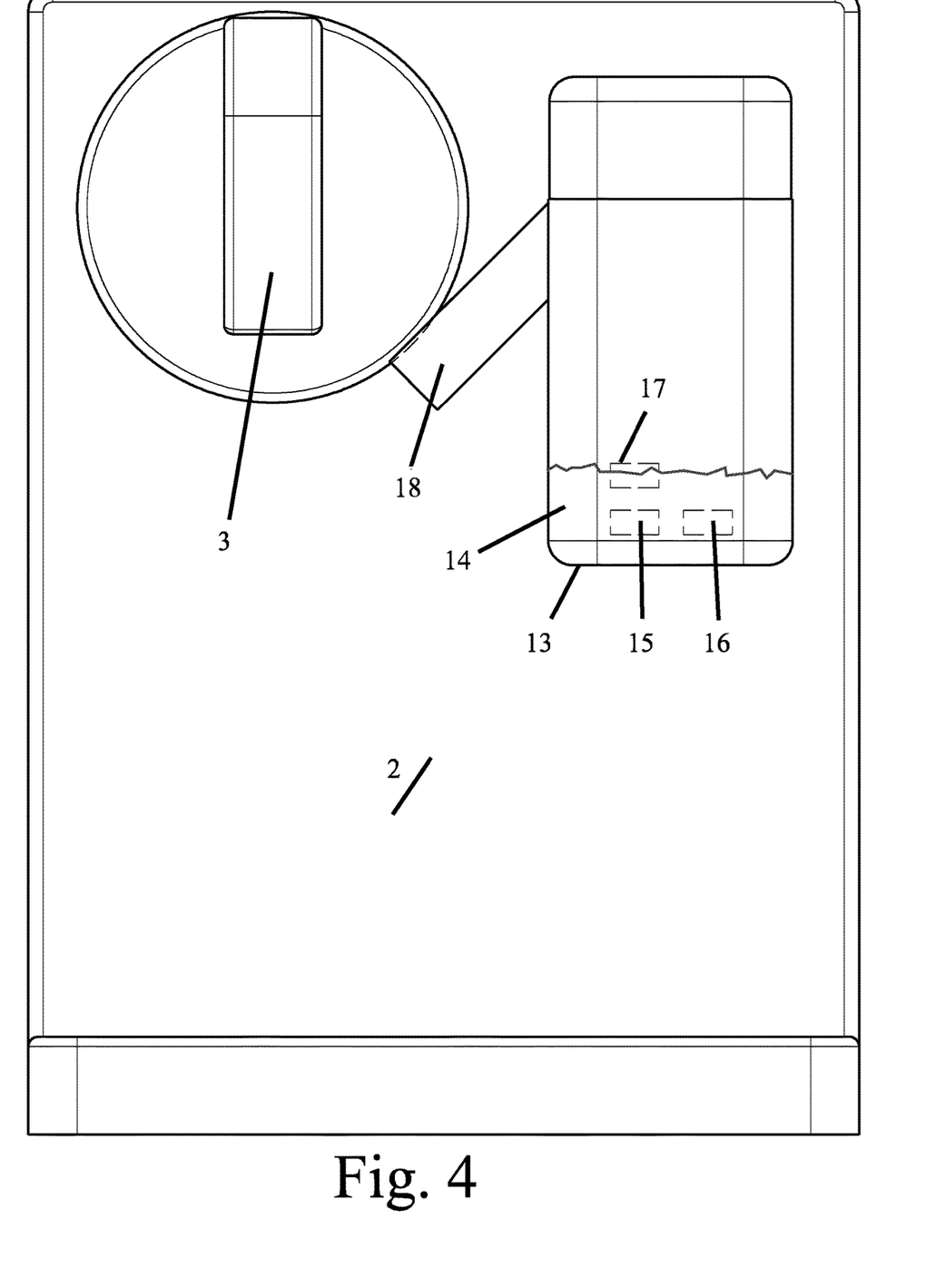
FIG. 4 is a front elevation view of the coffee machine with a system for emulsifying and heating the milk according to the invention with three sensors.
Figure 5:
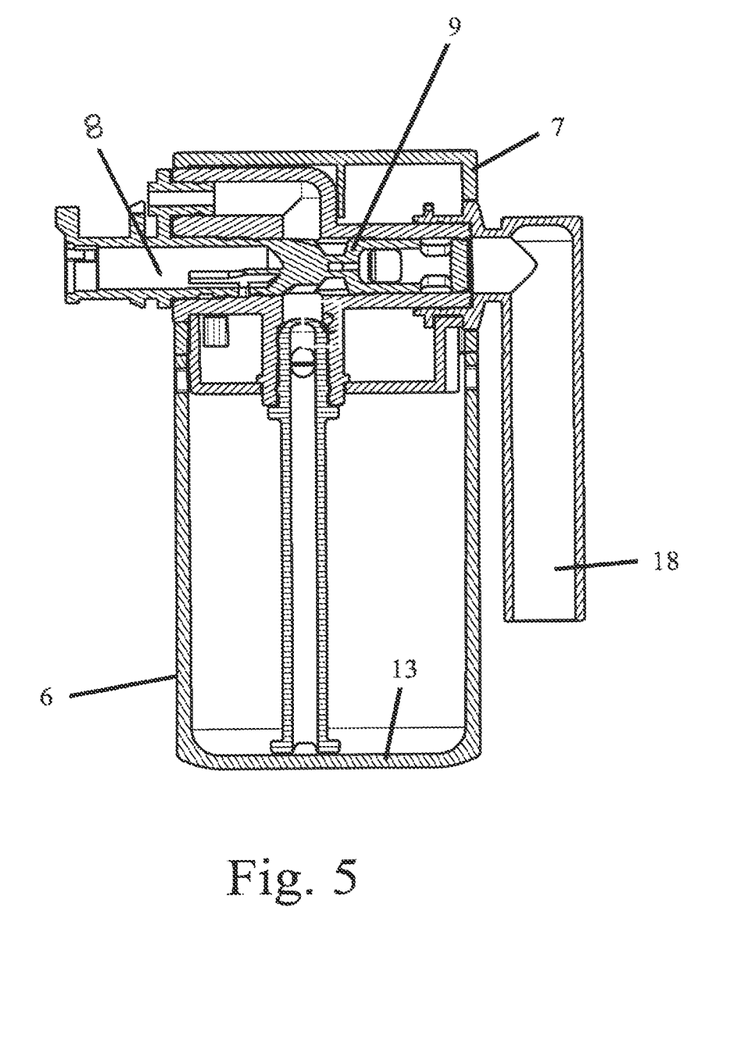
FIG. 5 is a sectional side elevation view of the coffee machine with a system for emulsifying and heating the milk according to the invention.

In more detail the detection means 12 comprise at least a first emitter sensor 15 and a second receiver sensor 16 for the optical detection of the residual amount 14 of milk in the carafe and are also able to read whether the carafe connected to the body 2 of the machine is present or not. The detection means also comprise at least a third sensor 17 so as to detect a first volume level of amount with said first and second sensors 15, 16 and a second volume level of the residual amount of milk in the carafe 6 when the carafe is completely empty.

The above is possible thanks to the fact that said first, second and third sensors are infrared sensors and, thus, when the carafe is full of milk, the milk absorbs its infrared rays so that they can be used as desired to detect the presence or absence of milk and presence or absence of the carafe.

When the steam is being dispensed, the water pump and the boiler (not shown) of the coffee machine 1 are activated and the milk is emulsified and/or heated and dispensed by the dispenser tube 18 until the first, second and third sensors 15, 16 and 17 detect the residual amount of milk in the carafe 6 and, thus, deactivate the boiler of the machine leaving however the pump thereof activated.

During the activation of the pump and the deactivation of the boiler, said coffee machine provides for dispensing the residual steam before completing the dispensing of milk from the carafe.

It should also be noted that the device 4 is completely outside of the body 2 of the coffee machine 1 and that the carafe 6 has a volume for containing said milk that is substantially equal to a standard dose of milk needed to make one cappuccino.

Since the device 4 is projected and therefore the weight of the carafe rests completely on the lid, the carafe is removably constrained to the lid by means of a connecting device which eliminates possible shifting in the position thereof so as to ensure that the sensors always have a correct reading of the amount of residual milk in the carafe.

The coffee machine with a system for emulsifying and heating the milk according to the invention is particularly advantageous since, irrespective of the amount of milk introduced in the carafe, the dispensing of the beverage will always be completed correctly until it is emptied.

The use of the sensors enables to provide with information on the status of the presence of milk and enables or interrupts the dispensing of steam of the coffee machine to the Venturi tube so as to interrupt the dispensing of milk in the cup at the completion of milk in the carafe but before having removed the annoying steam jets from the same dispenser tube that could ruin both the appearance of the beverage in the cup and also be dangerous for the user.

The guarantee of repeatability of the operation is given by the detection of the residual amount of milk in the carafe by the sensors and the control algorithm and guarantees an interruption in advance in the production of steam depending on the residual amount in the carafe so as to avoid steam puffs in the system both from the dispenser tube of milk and inside of the machine.

Figure 8:
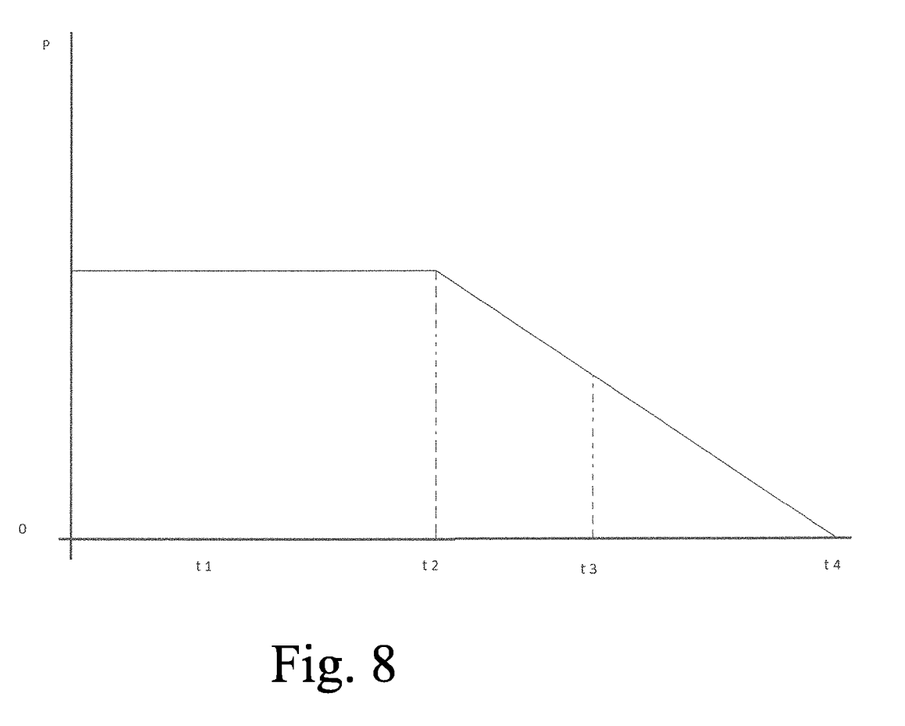
FIG. 8 shows schematically the steam cycle of the coffee machine with a system for emulsifying and heating the milk according to the invention.

As FIG. 8 shows clearly the diagram depicts the function of the steam cycle that enables to reduce the steam release in the machine and thus the residues/puffs at the end of the dispensing of milk from the device 4.

The phase (t1) represents the dispensing phase of the milk beverage with the boiler and the pump for generating the steam on in which the steam pressure is represented in y-axis.

The phase (t2) is concomitant to the detection of the minimum level of milk by the sensors and it represents the cooling phase of the boiler. In this phase the boiler is switched off but the pump remains on.

The phase (t3) is the release phase of the residual steam and the end of dispensing.

The phase (t4) shows the interruption of the dispensing function.

The coffee machine with a system for emulsifying and heating the milk thus conceived is susceptible to numerous modifications and variations, all within the scope of the inventive concept; moreover, all details can be replaced by technically equivalent elements.

In practice, the materials used and the size can be any according to the requirements and the state of the art.

The invention claimed is:

1. A coffee machine (1) with a system for emulsifying and heating milk, comprising a body (2) having a coffee dispenser (3) and a device (4) for emulsifying and/or heating the milk, said device (4) having a carafe (6) for containing the milk and a lid (7) for closing the carafe (6), means for conveying (8) steam generated inside the coffee machine to a Venturi tube (9) present in said lid (7) to emulsify and/or heat said milk inside said lid (7), wherein said device (4) is associated with a detection system (12) configured to detect a presence of said milk in said carafe (6) and to interrupt a dispensing of milk when said carafe (6) is completely empty, wherein said detection system (12) comprises at least a first emitter sensor (15) and a second receiver sensor (16) configured to optically detect a residual amount of said milk remaining in said carafe (6), and at least a third sensor (17) configured to detect a first volume level of the residual amount of said milk remaining in said carafe (6), with said first and second sensors (15, 16), and to detect a second volume level of said residual amount of said milk remaining in said carafe (6) when the carafe (6) is completely empty.

2. The coffee machine (1) with a system for emulsifying and heating milk according to claim 1, wherein said device (4) is removably associated with said machine in a projecting position with respect to said body (2) so that said carafe (6) remains at a distance from a support surface (10) for at least a first cup (11) for collecting said coffee and/or said emulsified and/or heated milk.

3. The coffee machine (1) with a system for emulsifying and heating milk according to claim 2, wherein said detection system (12) is configured to make it possible to substantially use an amount of steam dispensed so to use solely and exclusively the entire amount of milk present in said carafe (6).

4. The coffee machine (1) with a system for emulsifying and heating milk according to claim 3, wherein said detection system (12) is located on said machine at a distance from said support surface (10) so to be substantially positioned in proximity to a bottom of said carafe (6).

5. The coffee machine (1) with a system for emulsifying and heating milk according to claim 1, wherein said detection system (12) is positioned on said machine in proximity to a bottom of said carafe (6) and configured to detect a residual amount of milk remaining in said carafe (6) and to interrupt production of said steam in advance, an amount of time in advance being proportional to the volume of said residual amount.

6. The coffee machine (1) with a system for emulsifying and heating milk according to claim 1, wherein said lid (7) has a dispenser tube (18) for dispensing said emulsified and/or heated milk that is movable from a position with the axis substantially perpendicular to a support surface (10) for said first cup, to a position with the axis inclined, intersecting the flow of said coffee flowing out from said coffee dispenser (3).

7. The coffee machine (1) with a system for emulsifying and heating milk according to claim 6, wherein said dispenser tube (18) with the axis inclined, dispenses said milk in said first cup (11) together with said coffee and that said dispenser tube (18) with the axis being substantially perpendicular, dispenses said milk only in a second cup (20).

8. The coffee machine (1) with a system for emulsifying and heating milk according to claim 1, wherein said carafe (6) is removably constrained to said lid (7) by means of a connecting device that eliminates possible shifting in the positions thereof.

9. The coffee machine (1) with a system for emulsifying and heating milk according to claim 1, wherein, when said steam is being dispensed, said milk is emulsified and/or heated and dispensed by a dispenser tube (18) until said first, second and third sensors (15, 16, 17) detect said residual amount of said milk remaining in said carafe (6) and thus deactivate said heating, leaving said conveying to said Venturi tube (9) activated.

10. The coffee machine (1) with a system for emulsifying and heating milk according to claim 9, wherein, when said conveying to said Venturi tube (9) is in the activated mode and said heating is in the deactivated mode, said coffee machine provides for releasing the residual steam before the dispensing of said milk from said carafe (6) has been completed.

11. The coffee machine (1) with a system for emulsifying and heating milk according to claim 1, wherein said first, second and third sensors (15, 16, 17) are infrared sensors.

12. The coffee machine (1) with a system for emulsifying and heating milk according to claim 1, wherein said device (4) is completely outside of said body (2) of said coffee machine and that said carafe (6) has a volume for containing said milk that is substantially equal to a standard dose of milk needed to make one cappuccino.

* * * * *